(12) United States Patent
Banerjee et al.

(10) Patent No.: US 8,514,876 B2
(45) Date of Patent: Aug. 20, 2013

(54) METHOD AND APPARATUS FOR SEQUENCING OPERATIONS FOR AN INCOMING INTERFACE CHECK IN DATA CENTER ETHERNET

(75) Inventors: Ayan Banerjee, Fremont, CA (US); Raghava Sivaramu, Sunnyvale, CA (US); Hariharan Balasubramanian, Fremont, CA (US); Abhay Roy, Cupertino, CA (US); Santosh Rajagopalan, San Francisco, CA (US); Ronak Desai, Fremont, CA (US)

(73) Assignee: Cisco Technology, Inc., San Jose, CA (US)

(*) Notice: Subject to any disclaimer, the term of this patent is extended or adjusted under 35 U.S.C. 154(b) by 549 days.

(21) Appl. No.: 12/539,073

(22) Filed: Aug. 11, 2009

(65) Prior Publication Data

US 2011/0038257 A1    Feb. 17, 2011

(51) Int. Cl.
*H04L 12/28* (2006.01)
(52) U.S. Cl.
USPC ............ 370/419; 370/282; 370/359; 370/338
(58) Field of Classification Search
USPC .................................... 370/395.31, 463, 419
See application file for complete search history.

(56) References Cited

U.S. PATENT DOCUMENTS

| | | | | | |
|---|---|---|---|---|---|
| 5,128,926 | A * | 7/1992 | Perlman et al. | ............... | 370/248 |
| 6,111,941 | A * | 8/2000 | Schreyer | .................. | 379/220.01 |
| 6,151,324 | A * | 11/2000 | Belser et al. | .................. | 370/397 |
| 6,597,663 | B1 * | 7/2003 | Rekhter | ........................ | 370/252 |
| 6,744,774 | B2 * | 6/2004 | Sharma | ........................ | 370/401 |
| 6,820,134 | B1 * | 11/2004 | Zinin et al. | .................... | 709/238 |
| 6,823,395 | B1 * | 11/2004 | Adolfsson | ...................... | 709/242 |
| 7,058,845 | B2 * | 6/2006 | Fujita | ............................. | 714/4.2 |
| 7,286,479 | B2 * | 10/2007 | Bragg | ............................ | 370/238 |
| 7,742,465 | B2 * | 6/2010 | Hoffmann et al. | ............ | 370/352 |
| 7,864,669 | B2 * | 1/2011 | Bonaventure et al. | ........ | 370/225 |
| 8,102,883 | B2 * | 1/2012 | Kini et al. | ..................... | 370/503 |
| 8,264,950 | B2 * | 9/2012 | Hachiya et al. | ................ | 370/218 |
| 8,301,178 | B1 * | 10/2012 | Breau et al. | .................. | 455/465 |
| 8,340,627 | B2 * | 12/2012 | Edge | ........................ | 455/404.1 |
| 2006/0092941 | A1 * | 5/2006 | Kusama | ........................ | 370/392 |
| 2006/0187819 | A1 * | 8/2006 | Bryant et al. | ................. | 370/216 |
| 2006/0209826 | A1 * | 9/2006 | Kawamura | .................... | 370/390 |
| 2007/0286069 | A1 * | 12/2007 | Xu | ................................. | 370/218 |
| 2011/0141947 | A1 * | 6/2011 | Li et al. | ......................... | 370/259 |

OTHER PUBLICATIONS

Mick Seaman, "Link State Bridging Part 2," Jul. 12, 2008, pp. 1-6, http://www.ieee802.org/1/files/public/docs2008/aq-seaman-link-state-bridging-part2-0708.pdf.
Dave Allan, Jerome Chiabaut, Nigel Bragg, and Don Fedyk, "802.1aq Link State Protocol and Loop Prevention," Jan. 2008, pp. 1-15, http://www.ieee802.org/1/files/public/docs2008/aq-fedyk-loop-prevention-0121v1.pdf.

* cited by examiner

*Primary Examiner* — Ricky Ngo
*Assistant Examiner* — Dewanda Samuel
(74) *Attorney, Agent, or Firm* — P. Su

(57) ABSTRACT

In one embodiment, a method includes obtaining an indication that a state associated with a node is to be changed and preventing data from being received on a first link. The method also includes updating at least one selected from a group including an incoming interface check (IIC) table and an outgoing interface (OIF) table to reflect the state. The state indicates that a second link is to be activated. Finally, the method includes allowing the data to be received on the second link after updating either or both the IIC table and the OIF table and after the timer duration for the NULL value for IIC has expired.

20 Claims, 7 Drawing Sheets

US 8,514,876 B2

METHOD AND APPARATUS FOR SEQUENCING OPERATIONS FOR AN INCOMING INTERFACE CHECK IN DATA CENTER ETHERNET

BACKGROUND OF THE INVENTION

The disclosure relates generally to networking and, more particularly, to layer two networks.

Within networks, when packets enter into loops, the packets may be prevented from reaching the destinations for which they are ultimately intended. Packet looping may occur when a packet is repeatedly switched between nodes without forward progress towards the destination. When packets loop between nodes in a network, in addition to likely not reaching their intended destinations, the packets also utilize bandwidth in the network that may be used for other purposes. When packets fail to reach their intended destinations, and when valuable bandwidth in a network become unavailable for other purposes in order to allow for looping of packets, the overall performance of the network suffers.

A packet may begin to loop between nodes of a network when the packet visits a node that is in need of a state update. The node is unable to update its state until the packet leaves, or is otherwise flushed from, the network. However, because the state of the node has not yet been updated, the packet may continue to loop through the node. Such a packet may then be replicated while in an endless loop, as will be appreciated by those skilled in the art, thereby utilizing valuable bandwidth on links. As bandwidth on links may be is limited within a network, a packet that is in an endless loop may essentially waste valuable resources associated with the network.

BRIEF DESCRIPTION OF THE DRAWINGS

The disclosure will be readily understood by the following detailed description in conjunction with the accompanying drawings in which.

DESCRIPTION OF EXAMPLE EMBODIMENTS

Overview

Figure 1:
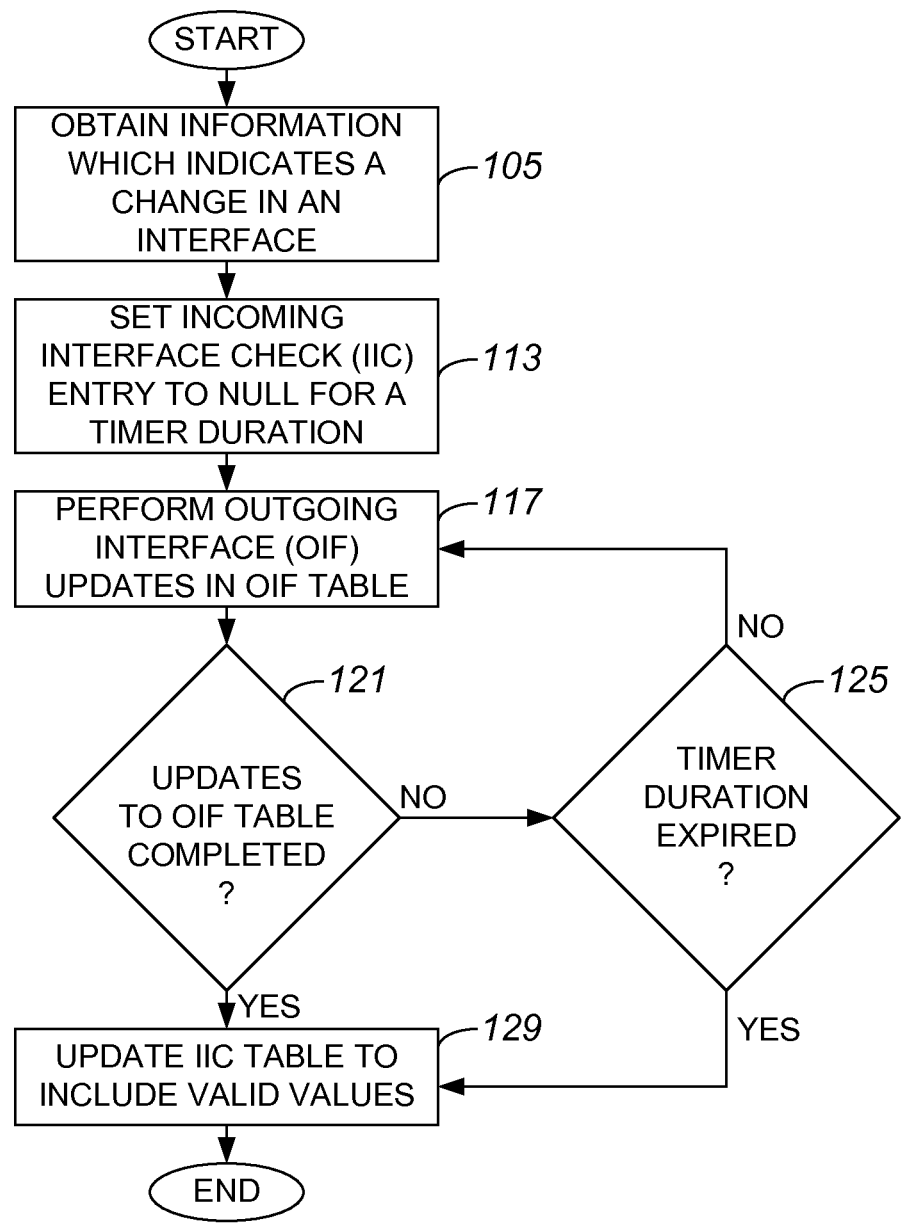
FIG. 1 is process flow diagram which illustrates a method of performing an update to an interface check table and an outgoing interface check table in a substantially sequential manner in accordance with an embodiment.

According to one aspect of the disclosure, a method includes obtaining an indication that a state associated with a node is to be changed and preventing data from being received on a first link. The method also includes updating at least one selected from a group including an incoming interface check (IIC) table and an outgoing interface (OIF) table to reflect the state. The state indicates that a second link is to be activated. Finally, the method includes allowing the data to be received on the second link after updating either or both the IIC table and the OIF table.

Description

Intermediate-system-to-intermediate-system (IS-IS) is a link-state routing protocol which carries layer 2 addresses to provide layer 2 routing in some environments. An IS-IS link-state protocol may be used in a layer 2 network to learn unicast locations and reachability information associated with layer 2.

An incoming interface check (IIC) may be performed on packets received from various nodes associated with a spanning tree used to deliver frames intended for multiple destinations associated with a layer 2 network. The IIC may be used to substantially ascertain whether a received frame or packet received from a switch is received on an expected link. In addition, an IIC may be performed on multicast data traffic in an effort to identify packets which are repeatedly looping through a particular set of nodes. Such traffic may be associated with a data center Ethernet. As will be appreciated by those skilled in the art, data center Ethernet allows local area network (LAN) and storage area network (SAN) connectivity within a network that supports Ethernet. Once identified, looping packets may be processed as appropriate, e.g., looping packets may be dropped in order to free up bandwidth.

Each node, e.g., switch, associated with a spanning tree network may include an IIC table which effectively provides each node with an overview of a network, and may be used to perform an IIC. In other words, the IIC table may provide information which may be used to verify interfaces on which traffic is received. The information may include, but is not limited to including, data that identifies an incoming link to be used by traffic received or otherwise obtained from a particular node. For example, the IIC table may identify a node and a link on which packets are transmitted to and from the node.

An outgoing interface (OIF) table, like an IIC table, may also provide an overview of a network. Information included in an OIF table may be used to verify interfaces on which traffic is to be broadcasted or otherwise transmitted within a network. For example, an OIF table associated with a node may include information that identifies an outgoing link to be used to send traffic to another node. In general, OIF table may also be arranged to identify nodes behind a multicast group.

When the topology of a network changes, entries in IIC tables and entries in OIF tables are updated accordingly. For example, when an outgoing interface to be used to send a packet from a first node to a second node on a level 2 network is affected by a network change, an entry in the OIF table for the first node and an entry in the IIC table for the second node are updated. Unless entries in IIC tables and entries in OIF tables are updated relatively shortly after updates are received, packets in the network may potentially loop or be duplicated within the network. As such, to reduce the occurrences of looping and/or duplication of packets, a node in a layer 2 network may be configured to substantially atomically update IIC and OIF tables such that the IIC and OIF tables are consistent or otherwise substantially in sync. In one embodiment, an entry in an IIC table corresponding to a node with an updated link may be substantially removed from the IIC table until the entry may be updated. Removing such an entry from the IIC table may cause packets received from the node to be dropped and, thus, effectively prevented from being routed.

Substantially atomically updating entries in an IIC table and/or an OIF table of a node effectively allows the node to have a current view of a network, and enables the node to efficiently receive and send packets using current interfaces. A timer-based sequencing operation may be tuned, e.g., by selecting timer values, to substantially eliminate looping packets and duplicate packets. That is, timer values may be selected to allow in-flight packets to be dropped while gates are closed, i.e., while entries in an IIC table and an OIF table are in the process of being updated. In one embodiment, the IIC table and the OIF table may be updated sequentially once an appropriate entry in the IIC table is effectively removed, e.g., set to a null value. In another embodiment, the IIC table and the OIF table may be updated substantially simultaneously once appropriate.

Referring initially to FIG. 1, a process of performing an update to an IIC table and an OIF table in a substantially sequential manner will be described in accordance with an embodiment. A process 101 of updating tables begins at step 105 in which a node, e.g., a switch, that is part of a network of nodes obtains information which indicates that an interface on which packets are to be sent is to be changed. Such information may be obtained by the node, for example, when a link that is currently in use fails, and a switch to another link is indicated in order to allow packets to be routed through the node. In one embodiment, an IS-IS software processor of the neighboring node may send a message the node which identifies active links associated with the neighboring node. Alternatively, such information may also be obtained when a neighboring node changes from using a first link to a second link, and it no longer becomes possible to reach the neighbor through the first link.

Once information is obtained which indicates that an interface is to be changed, or that a state of a node is to essentially be changed, the node sets an IIC entry to null for a timer duration in step 113. That is, an IIC entry associated with the interface to be changed is effectively deleted for a particular amount of time, e.g., until a timer expires. By way of example, an entry relating to the neighboring node in the IIC table may be removed. Effectively deleting the IIC entry may substantially cause any packet using the interface associated with the deleted IIC entry to be dropped by the node. The timer duration may vary widely depending upon the requirements of an overall system that includes the node. In one embodiment, the timer duration may be a period that is proportional to a propagation delay associated with the network multiplied by a network diameter. As will be appreciated by those skilled in the art, a network diameter is typically an average minimum distance between pairs of nodes in a network. A propagation delay associated with a network may be a network diameter delay. The timer duration may also generally be a function of a number of nodes in a network and/or the estimated amounts of time expected to be needed to propagate information from one end of the network to the other.

From step 113, process flow moves to step 117 in which updates are made to an OIF table. Making updates to the OIF table may include updating the OIF list to identify current outgoing interfaces for the node to use to reach other nodes in the network. In general, updating entries in the OIF table may include updating locative temporal logic (LTL) associated with the network. Updating entries in the OIF table may also include updating multicast groups and/or updating information relating to nodes behind the multicast groups.

A determination is made in step 121 regarding whether the updates to the OIF table are completed. If it is determined that the updates to the OIF table are completed, the IIC table is updated in step 129 to include valid values. Updating the IIC table to include valid values generally involves substantially replacing the null values set in step 113 to a value which identifies the current interface to be used by the node. That is, an entry that was substantially removed from the IIC table in step 113 may be updated and added back into the IIC table. Once the IIC table is updated, the process of updating tables is completed.

Returning to step 121, if it is determined that the updates to the OIF table are not completed, process flow moves to step 125 in which it is determined whether the timer duration has expired. If the timer duration has not expired, process flow returns to step 117 in which the OIF table continues to be updated. Alternatively, if it is determined that the timer duration has expired, then the IIC table is updated to include valid values in step 129.

Figure 2:
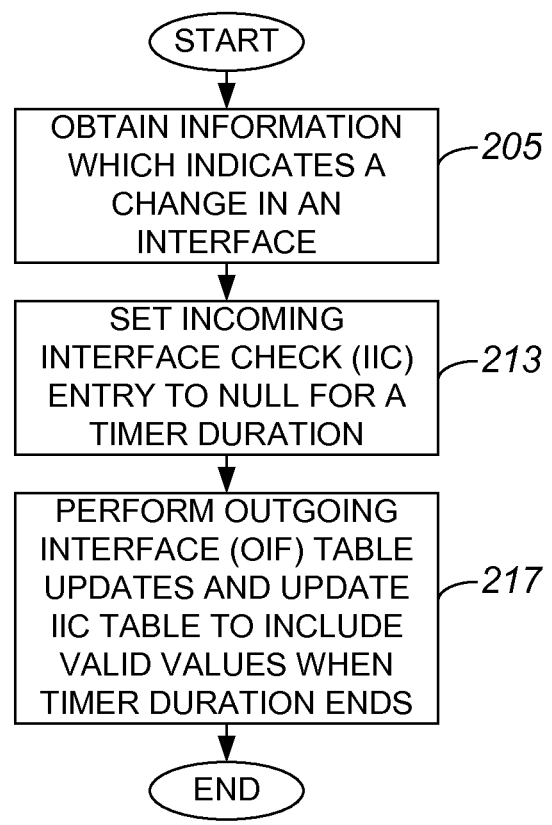
FIG. 2 is a process flow diagram which illustrates a method of performing an update to an interface check table and an outgoing interface check table in a substantially parallel manner in accordance with an embodiment.

Some nodes may update OIF and IIC tables sequentially, or in series, as discussed above with respect to FIG. 1. Other nodes may update OIF and IIC tables substantially at the same time, or in parallel. FIG. 2 is a process flow diagram which illustrates a method of performing an update to an IIC table and an OIF table in a substantially parallel manner in accordance with an embodiment. A process 201 of updating tables begins at step 205 in which information that indicates a change in an interface is obtained by a node. Once information is obtained, process flow moves to step 213 in which an IIC entry, e.g., an IIC entry associated with the change in the interface, is set to null for a timer duration. The timer duration may vary widely, and may be determined based at least in part upon how long table updates are anticipated to take. During the timer duration, or until the timer expires, any traffic intended to be sent on an IIC for which a value is set to null is effectively dropped.

In step 217, an OIF table and an IIC table are updated when the timer duration ends, or when a timer expires. The OIF table and the IIC table may be updated to include valid values substantially simultaneously. Updating the IIC table may include replacing the null value for the IIC that was set in step 213. Once the OIF table and the IIC table are updated, packets that are sent to the node may be received on an interface identified in the updated IIC table, while packets that are sent by the node may be sent on an interfaced identified in the updated OIF table. The process of updating tables ends when the OIF and IIC tables are updated.

Figure 3A:
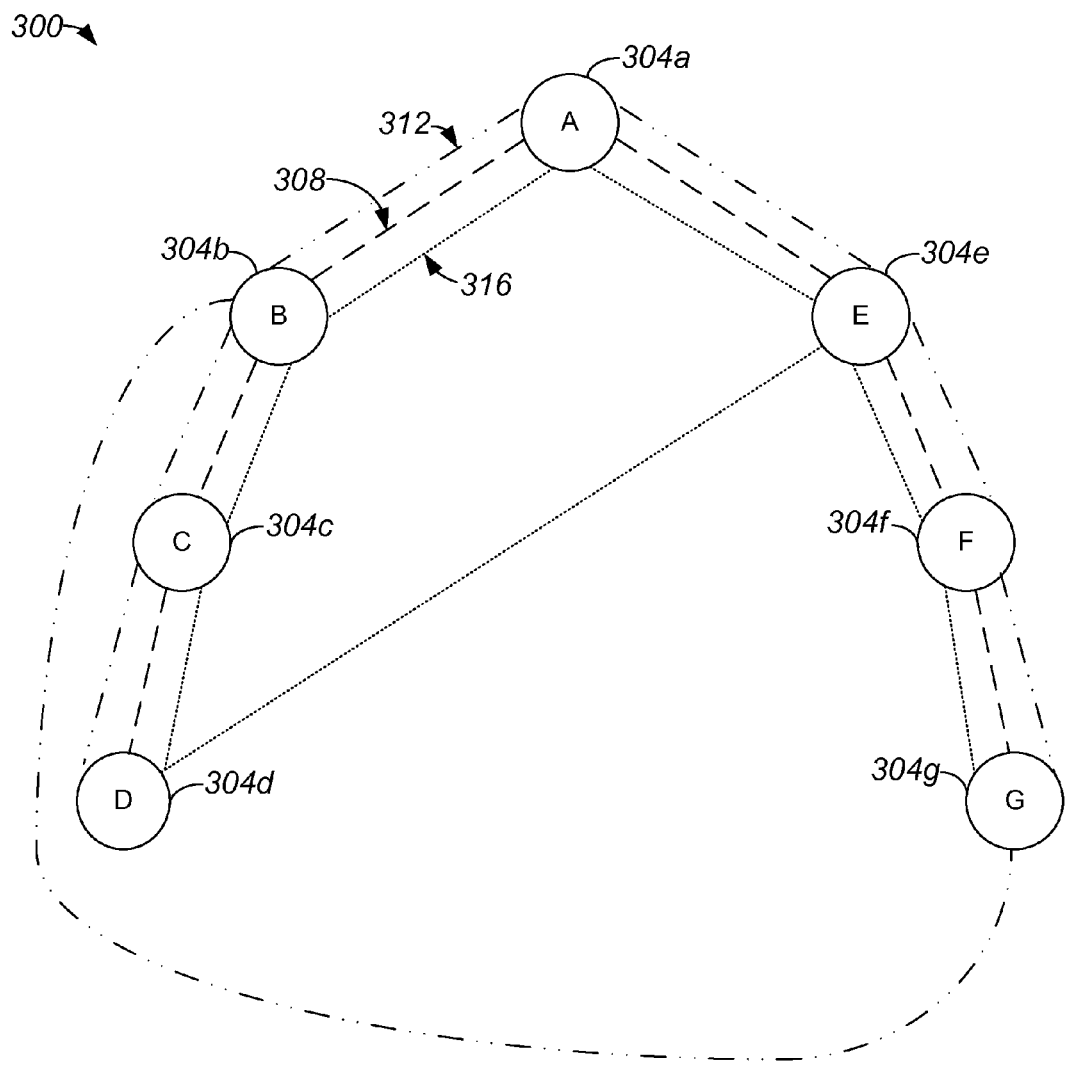
FIG. 3A is a diagrammatic representation of a network of nodes in accordance with an embodiment.

The ability of a node to effectively prevent packets from being received from particular nodes until OIF and IIC tables are updated reduces the number of packets which are repeatedly looping through that node, and/or are duplicated by that node. One example updating OIF and IIC tables such that the looping of and/or duplication of packets may be substantially reduced will be described below with reference to FIGS. 3A-D. FIG. 3A is a diagrammatic representation of a network of nodes in which at least one node has the capability of effectively preventing packets from being received until OIF and IIC tables are updated in accordance with an embodiment. A network 300 includes a plurality of nodes 304*a-g*. Nodes 304*a-g*, which may generally be network switches, include a root node 304*a*. Nodes 304*a-g* are generally networked using trees 308, 312, 316.

Figure 3B:
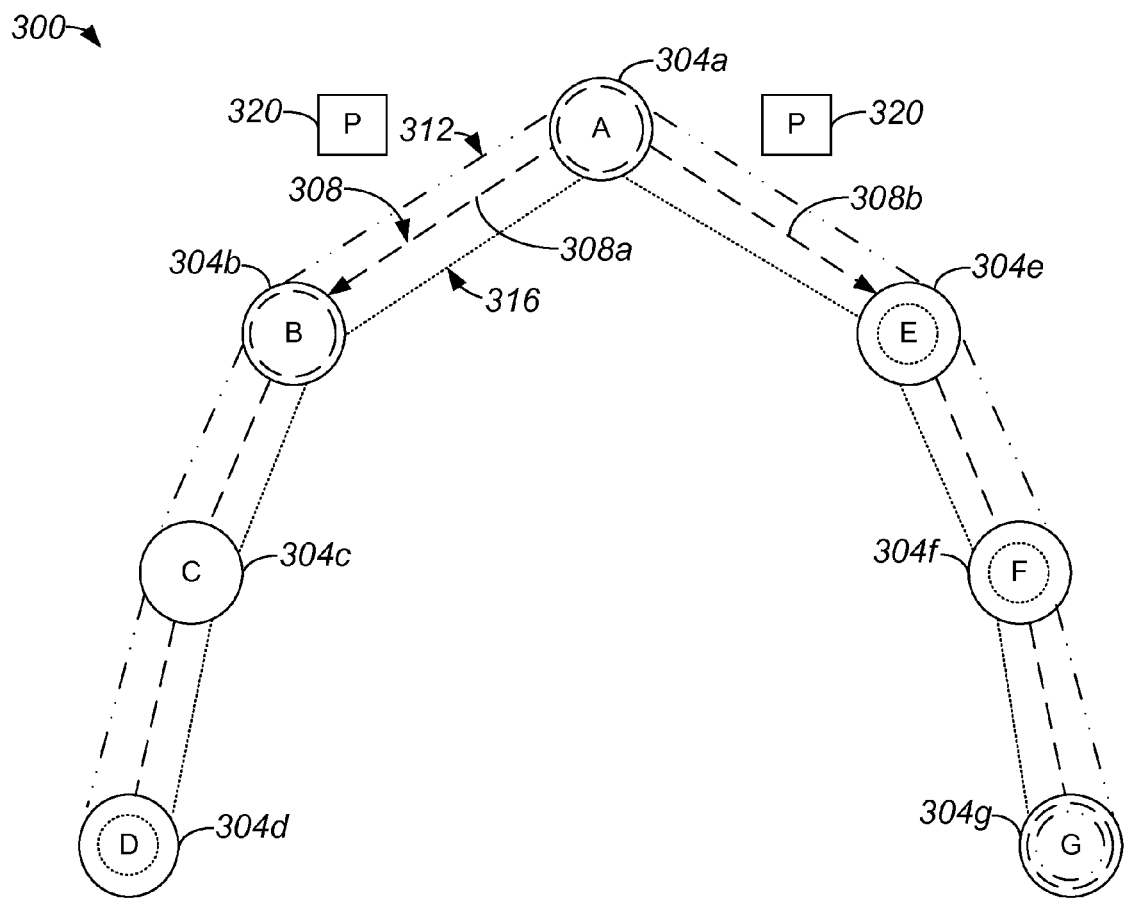
FIG. 3B is a diagrammatic representation of a network of nodes, e.g., network 300 of FIG. 3A, at a time t1 at which a packet is broadcast by a root node in accordance with an embodiment.
Figure 3C:
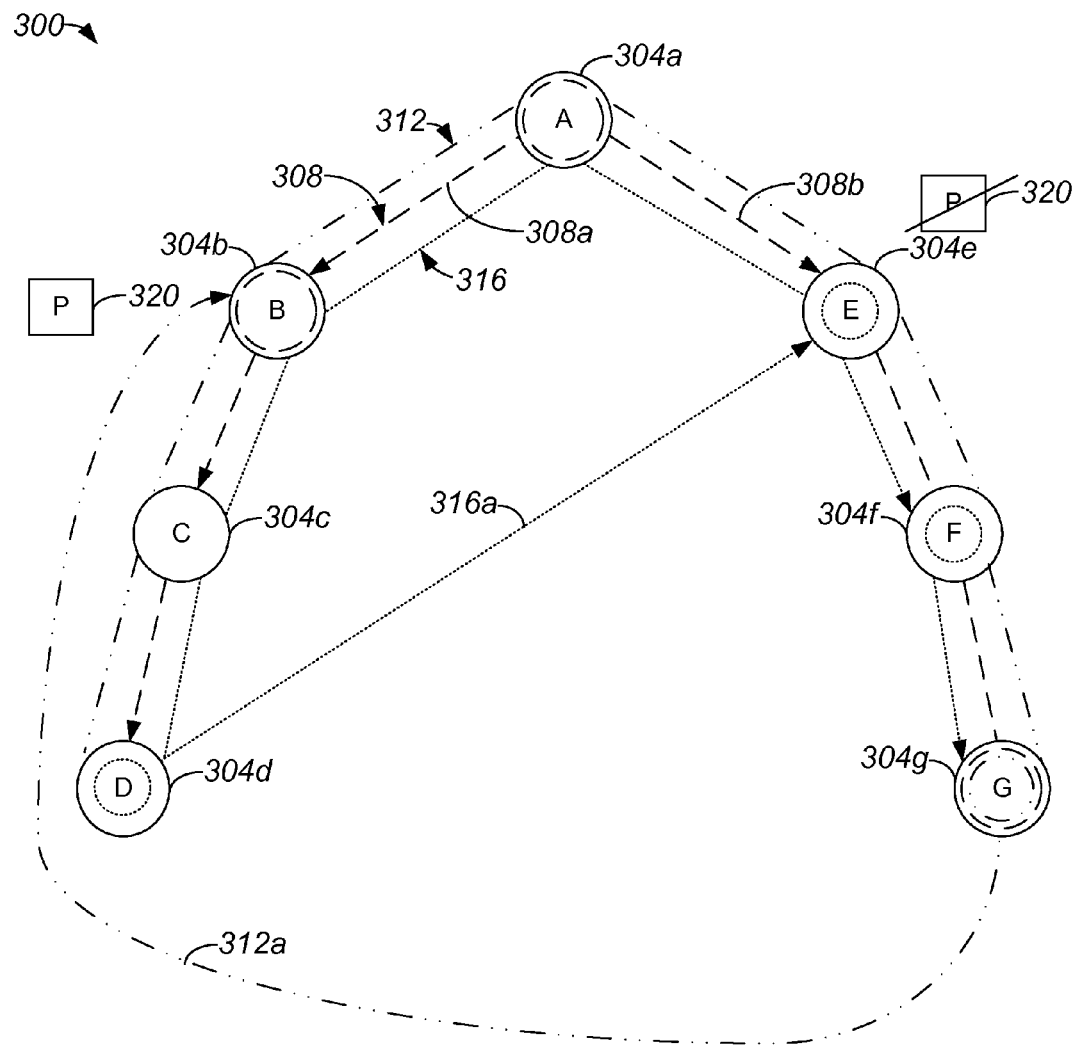
FIG. 3C is a diagrammatic representation of a network of nodes, e.g., network 300 of FIG. 3B, at a time t2 at which a packet is processed by various nodes in accordance with an embodiment.

FIG. 3B is a diagrammatic representation of network 300 at a time t1 at which a packet is broadcast by root node 304a in accordance with an embodiment. At time t1, the cost of using a first link 308a between root node 304a and node 304b increases. Also, a second link 312a, or a link 312a that is announced as part of second Link State Packet (LSP) 312, between node 304b and node 304g effectively comes up and, a third link 316a, or a link 316a that is a part of third LSP 316, between node 304d and node 304e effectively comes up at time t1. Prior to time t1, root node 304a and node 304b have processed first LSP 308, while node 304c has not processed any LSPs. Nodes 304d-f have processed third link announced in the LSP 316 prior to time t1, and node 304g has processed both first LSP 308 and a second LSP 312. A packet 320 is originated by root node 304a at approximately time t1, and broadcasted by root node 304a on first LSP link 308a to node 304b and on first LSP link 308b to node 304e.

At a time t2, as indicated in FIG. 3B, because node 304e is using third LSP 316, and packet 320 is received by node 304e on first LSP link 308b, node 304e drops packet 320. Packet 320 that is received by node 304b on first LSP link 308a may be sent on first LSP 308 from node 304b, through node 304c, to node 304d. Nodes 304d-f may accept packet 320 on third LSP 316, while node 304g may accept packet 320 on second LSP 312. Upon accepting packet 320 on second LSP 312, node 304g may forward packet 320 substantially directly to node 304b using second LSP link 312a.

Figure 3D:
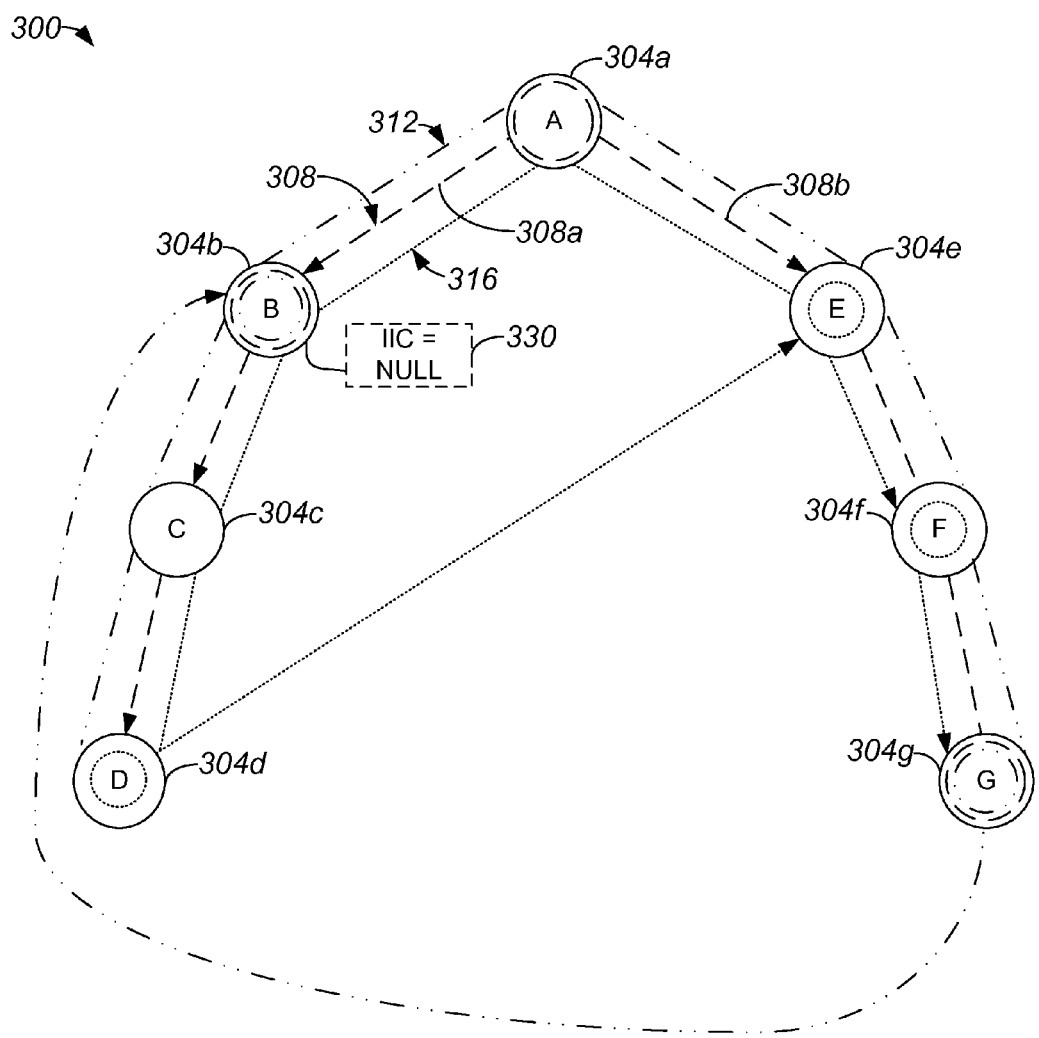
FIG. 3D is a diagrammatic representation of a network of nodes, e.g., network 300 of FIG. 3A, at a time at which a node updates itself to effectively ensure that packets in flight are dropped to prevent a transient loop in accordance with an embodiment.

In the described embodiment, node 304b may accept packet 320 from node 304g on second LSP link 312a because node 304b effectively prevents packet 320 from being received in order to update its IIC table to indicate that second LSP link 312a is to be used. FIG. 3D is a diagrammatic representation of network 300 which shows node 304b updating its IIC table in accordance with an embodiment. As shown, while node 304b updates its IIC table 330, node 304b sets an IIC to null. The null value may remain in IIC table 330 for a duration. Such a duration may be, for example, a time substantially proportional to a network diameter delay. When the duration expires, node 304b updates IIC table 330 to indicate that second LSP 312 is to be used. In general, an appropriate OIF table may also be updated, although it should be appreciated that in some instances, an OIF table may not need to be updated.

Figure 4:
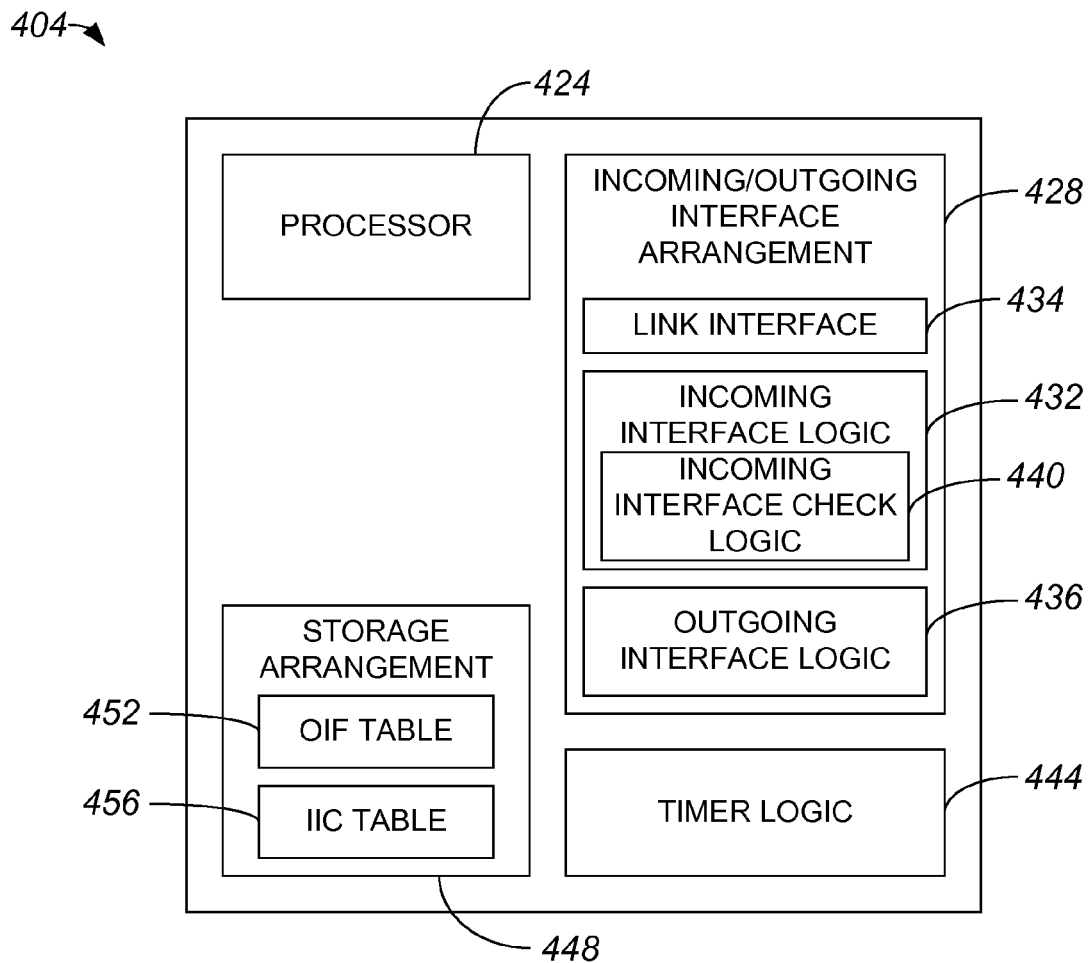
FIG. 4 is a block diagram representation of a node that is capable of approximately atomically updating tables used to route packets in accordance with an embodiment.

FIG. 4 is a block diagram representation of a node, e.g., a switch, which is capable of approximately atomically updating tables used to route packets in accordance with an embodiment. A node 404 includes a processor 424 and a storage arrangement 448. Processor 424 may generally execute software logic. Storage arrangement 448 may be a database or a memory arrangement on which an OIF table 452 and an IIC table 456 may be stored.

An incoming/outgoing interface arrangement 428 is generally configured to receive, send, and process packets, as well as to effectively implement a sequencing operation that enables OIF table 452 and IIC table 456 to be updated. Arrangement 428 includes link interfaces 434, incoming interface logic 432, and outgoing interface logic 436. Link interfaces 434 are a physical interface to links on which packets are sent and received. Incoming interface logic 432 is configured to process incoming packets, and include IIC logic 440. IIC logic 440 maintains IIC table 456, and performs checks on incoming packets to determine whether a particular packet has been received on an expected interface. Outgoing interface logic 440 maintains OIF table 452, and parses packets to be forwarded through or otherwise sent by node 404 to identify a destination for the packets. Outgoing interface logic 440 also uses OIF table 452 to identify how to forward or otherwise send packets to particular destinations.

Timer logic 444 is configured to implement a timer that runs while arrangement 428 updates OIF table 452 and IIC table 456. Timer logic 444 is also arranged to determine an appropriate duration for which the timer is to run.

Although only a few embodiments have been described, it should be understood that the disclosure may be embodied in many other specific forms without departing from the spirit or the scope of the disclosure. By way of example, the amount of time for which an IIC is set to null may vary widely. As previously mentioned, the IIC may be set to null for a timer duration that is proportional to a network diameter delay. In general, however, the timer duration may be selected to be long enough to allow for packets to be forwarded on the same LSP or graph on which they are received on such that loops and/or duplicate packets may be substantially terminated.

The embodiments may be implemented as hardware and/or software logic embodied in a tangible medium that, when executed, is operable to perform the various methods and processes described above. That is, the logic may be embodied as physical arrangements or components. A tangible medium may be substantially any computer-readable medium that is capable of storing logic which may be executed, e.g., by a computing system, to perform methods and functions associated with the embodiments of the disclosure. For example, logic operable to perform the methods associated with the disclosure may be code devices or program code that is embodied on a computer-readable storage medium.

The steps associated with the methods of the present invention may vary widely. Steps may be added, removed, altered, combined, and reordered without departing from the spirit of the scope of the disclosure. For example, a timer duration may generally be calculated using any suitable method. Therefore, the present examples are to be considered as illustrative and not restrictive, and the disclosure is not to be limited to the details given herein, but may be modified within the scope of the appended claims.

What is claimed is:

1. A method comprising:
    obtaining an indication that a state associated with a node is to be changed;
    preventing data from being received on a first link;
    identifying an entry in an incoming interface check (IIC) table that is associated with the state;
    setting the entry in the IIC table to a first value for a duration, the first value being arranged to indicate that the entry is not valid;
    updating at least one selected from a group including the IIC table and an outgoing interface (OIF) table to reflect the state after identifying the entry in the IIC table that is associated with the state, wherein the state indicates that a second link is to be activated; and
    allowing the data to be received on the second link after updating the at least one selected from the group including the IIC table and the OIF table.

2. The method of claim 1 wherein the node is included in a layer 2 network, the layer 2 network having a network diameter delay, and wherein the duration is approximately proportional to the network diameter delay.

3. The method of claim 1 wherein the first value is a null value, and wherein updating the IIC table to reflect the state includes setting the entry in the IIC table to a second value, the second value being valid.

4. The method of claim 1 wherein updating the at least one selected from the group including the IIC table and the OIF table to reflect the state includes updating the OIF table, determining when the duration has expired, and updating the IIC table.

5. The method of claim 1 wherein updating the at least one selected from the group including the IIC table and the OIF table to reflect the state includes updating the OIF table and the IIC table at approximately a same time.

6. The method of claim 5 wherein updating the at least one selected from the group including the IIC table and the OIF table to reflect the state further includes determining when the duration has expired, the OIF table and the IIC table being updated after the duration has expired.

7. The method of claim 6 wherein allowing the data to be received on the second link includes allowing the data to be received after updating the OIF table and the IIC table.

8. Logic embodied on a non-transitory, tangible medium that, when executed, is operable to:
   obtain an indication that a state associated with a node is to be changed;
   prevent data from being received on a first link;
   identify an entry in an incoming interface check (IC) table that is associated with the state;
   set the entry in the IIC table to a first value for a duration, the first value being arranged to indicate that the entry is not valid;
   update at least one selected from a group including the IIC table and an outgoing interface (OIF) table to reflect the state after the entry in the IIC table that is associated with the state is identified, wherein the state indicates that a second link is to be activated; and
   allow the data to be received on the second link after updating the at least one selected from the group including the IIC table and the OIF table.

9. The logic of claim 8 wherein the node is included in a layer 2 network, the layer 2 network having a network diameter delay, and wherein the duration is approximately proportional to the network diameter delay.

10. The logic of claim 8 wherein the first value is a null value, and wherein the logic operable to update the IIC table to reflect the state is further operable to set the entry in the IIC table to a second value, the second value being valid.

11. The logic of claim 8 wherein the logic operable to update the at least one selected from the group including the IIC table and the OIF table to reflect the state is further operable to update the OIF table, determine when the duration has expired, and update the IIC table.

12. The logic of claim 8 wherein the logic operable to update the at least one selected from the group including the IIC table and the OIF table to reflect the state is further operable to update the OIF table and the IIC table at approximately a same time.

13. The method of claim 12 wherein the logic operable to update the at least one selected from the group including the IIC table and the OIF table to reflect the state is further operable to determine when the duration has expired, the OIF table and the IIC table being updated after the duration has expired.

14. The logic of claim 13 wherein the logic operable to allow the data to be received on the second link is further operable to allow the data to be received after the OIF table and the IIC table are updated.

15. An apparatus comprising:
   means for obtaining an indication that a state associated with a node is to be changed;
   means for preventing data from being received on a first link;
   means for identifying an entry in an incoming interface check (IIC) table that is associated with the state;
   means for setting the entry in the IIC table to a first value for a duration, the first value being arranged to indicate that the entry is not valid;
   means for updating at least one selected from a group including the IIC table and an outgoing interface (OIF) table to reflect the state, wherein the state indicates that a second link is to be activated; and
   means for allowing the data to be received on the second link after updating the at least one selected from the group including the IIC table and the OIF table.

16. An apparatus comprising:
   a first interface, the first interface being arranged to obtain an indication that a state of the apparatus is to be updated; and
   a logic arrangement, the logic arrangement being configured to prevent data from being received on the first link, the logic arrangement further being arranged to update at least one selected from a group including an IIC table and an outgoing interface (OIF) table to reflect the state, wherein the first interface is further configured to allow data to be received on a second link and not the first link, wherein the logic arrangement is further configured to identify an entry in the IIC table that is associated with the state before updating the at least one selected from the group including the IIC table and the OIF table, and to set the entry in the IIC table to a first value for a duration, the first value being arranged to indicate that the entry is not valid.

17. The apparatus of claim 16 wherein the apparatus is included in a layer 2 network, the layer 2 network having a network diameter delay, and wherein the duration is approximately proportional to the network diameter delay.

18. The apparatus of claim 16 wherein the first value is a null value, and wherein the logic arrangement is configured to update the IIC table by setting the entry in the IIC table to a second value, the second value being valid.

19. The apparatus of claim 16 wherein the logic arrangement updates the at least one selected from the group including the IIC table and the OIF table to reflect the state by updating the OIF table and the IIC table at approximately a same time.

20. The apparatus of claim 16 wherein the logic arrangement updates the at least one selected from the group including the IIC table and the OIF table to reflect the state by updating the OIF table, determining when the duration has expired, and updating the IIC table.

* * * * *